United States Patent [19]

Fellberg

[11] 4,331,065

[45] May 25, 1982

[54] ENGINE PISTON ASSEMBLY WITH IMPROVED OIL CONTROL

[75] Inventor: Michael Fellberg, Grosse Ile, Mich.

[73] Assignee: General Motors Corporation, Detroit, Mich.

[21] Appl. No.: 85,947

[22] Filed: Oct. 18, 1979

[51] Int. Cl.³ .............................................. F16J 1/08
[52] U.S. Cl. .................... 92/158; 123/193 P; 277/75; 277/214
[58] Field of Search .............. 123/193 P; 92/158, 159; 277/75, 214

[56] References Cited

U.S. PATENT DOCUMENTS

| 1,368,447 | 2/1921 | Megson. | |
|---|---|---|---|
| 3,003,837 | 10/1961 | La Flame et al. | 92/158 |
| 3,056,638 | 10/1962 | Hovde | 123/193 P |
| 3,179,093 | 4/1965 | Sims et al. | 277/214 X |
| 3,195,903 | 7/1965 | Hesling | 277/214 X |
| 3,555,972 | 1/1971 | Hulsing | 123/193 P |
| 3,762,389 | 10/1973 | Malina | 123/193 P |

FOREIGN PATENT DOCUMENTS

| 68717 | 8/1951 | Netherlands | 92/158 |
|---|---|---|---|
| 794620 | 5/1958 | United Kingdom | 277/214 |

OTHER PUBLICATIONS

Type III Technical Manual, "Diesel Engine for Propulsion", Navy Dept., May 1958, Edition G-20.

Primary Examiner—Irwin C. Cohen
Attorney, Agent, or Firm—Robert J. Outland

[57] ABSTRACT

An engine piston and ring assembly providing improved oil control and where applicable sealing of scavenging air. In a preferred embodiment applicable to two-cycle port scavenged diesel engines and similar applications, the piston is provided with dual oil ring grooves near its open end, which is free from drain openings through the wall in the vicinity of the ring grooves to the oil cooled hollow interior of the piston. Drainage of lubricating oil scraped from the cylinder walls by the rings is provided instead by scalloped recesses in the lower wall surface extending from the open end of the piston to the nearest ring groove. The arrangement reduces leakage of scavenging air from the inlet ports to the engine crankcase as well as the occasional flooding of the piston rings with the cooling oil from the piston interior.

4 Claims, 4 Drawing Figures

U.S. Patent   May 25, 1982   4,331,065
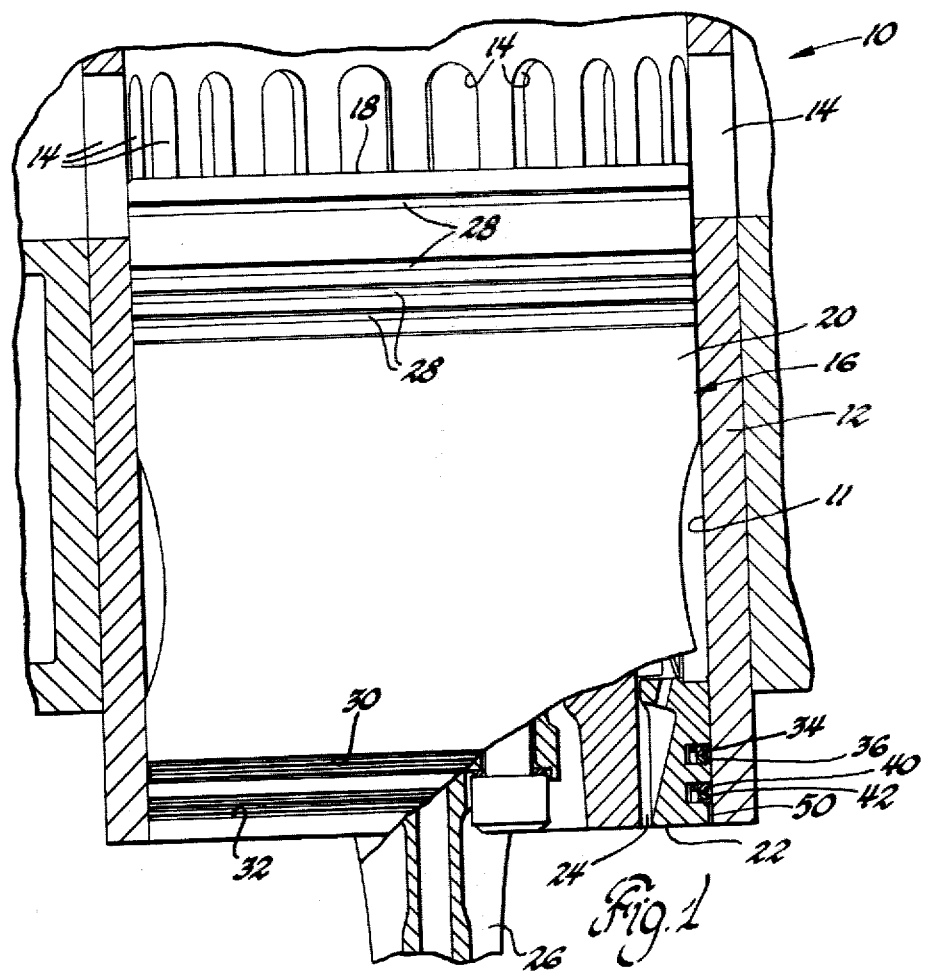
Fig. 1
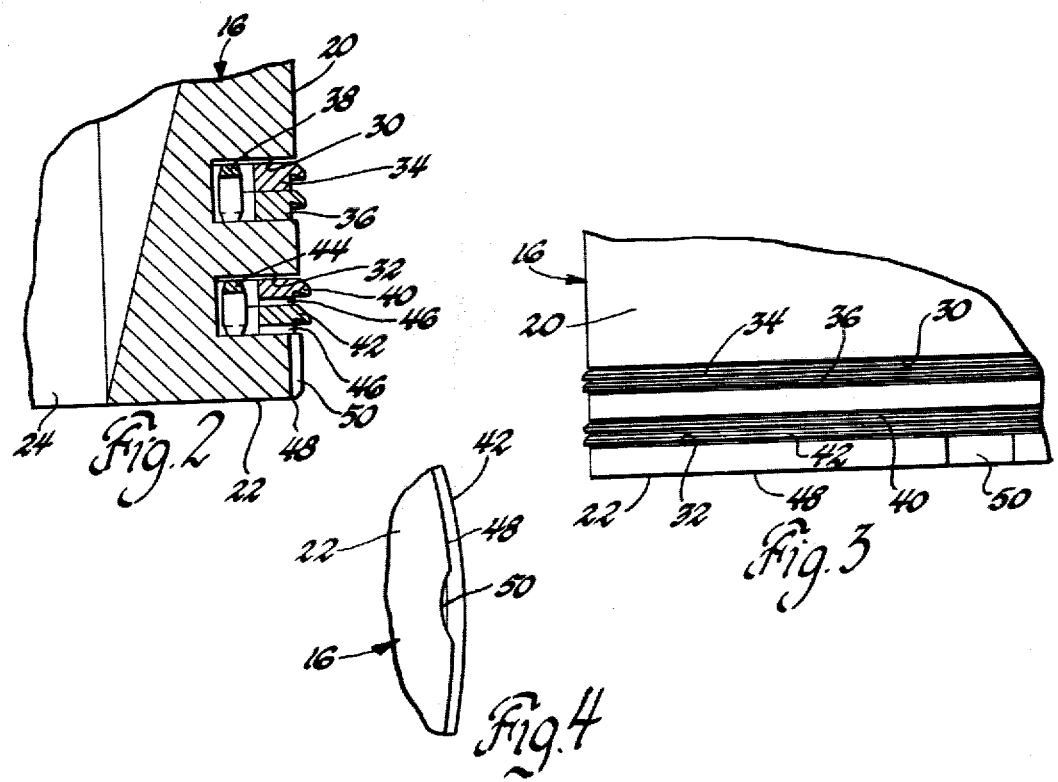
Fig. 2
Fig. 3
Fig. 4

ENGINE PISTON ASSEMBLY WITH IMPROVED OIL CONTROL

TECHNICAL FIELD

This invention relates to internal combustion engines and, more particularly, to piston and ring assemblies for use in such engines. In a more specific aspect, the engine relates to piston assemblies for improved oil control in ported cylinder internal combustion engines, such as two-cycle diesel engines.

BACKGROUND OF THE INVENTION

It is known in the art relating to internal combustion engines, including two-cycle diesel engines, to provide pistons reciprocable in the engine cylinders and sealed by compression rings near the closed (combustion chamber) end of the cylinder. One or more oil control rings are commonly provided for scraping excess lubricating oil from the cylinder walls.

In ported cylinder engines, such as for example some two-cycle diesel engines having intake ports intermediate the ends of the cylinders, the oil control rings are conventionally placed near the bottom edge of their piston skirt. They are thus located so that these rings do not travel above the lower edges of the air inlet ports during reciprocation of the piston in its cylinder. Thus, the oil control rings in ported cylinder engines generally have the dual purposes of (1) preventing the loss of excessive lubricating oil into the engine inlet air chamber and the combustion chamber and (2) sealing the cylinder against the excessive loss of intake air from the air chamber into the engine crankcase.

In the past it has been common in combustion engine practice with both ported cylinder engines and other engines, to provide some type of drain passage or passages extending through the piston walls either at, or immediately below the oil ring grooves. These passages are provided to drain to the interior of the piston, and thus to the engine crankcase, oil scraped by the oil rings from the cylinder walls, so as to prevent the excessive buildup of oil at the scraping edges of the rings. However, this arrangement of oil control features, particularly when applied to oil cooled pistons in heavy duty engines such as for example two-cycle diesel engines, has sometimes permitted flooding of the oil control rings with cooling oil from the interior of the piston by passage through the drain openings. Also, such openings have permitted the free flow to the crankcase of scavenging air which leaks past the top oil control ring, thus by-passing the second oil control ring completely.

SUMMARY OF THE INVENTION

The present invention provides an improved piston assembly and oil control ring arrangement which yields improved oil control, particularly when utilized with oil cooled pistons, and improved sealing of scavenging and charging air when utilized with ported cylinder engines.

A feature of the invention is that the drain openings to the piston interior at or near the oil ring grooves are eliminated so that the lower skirt is free of such openings, thus preventing the flooding of the oil control rings with piston cooling oil from the skirt interior.

Another feature of the invention is that drainage of oil scraped from the cylinder walls by the oil control rings is provided by relief recess means, preferably in the form of a pair of scalloped recesses in the piston outer wall, extending from the open lower end of the piston up to the closest oil ring groove. In a preferred embodiment, no relief is provided between the oil ring grooves.

Yet another feature of the invention is that dual axially spaced oil ring grooves are provided, each having dual oil rings therein. In a preferred embodiment, the oil rings of the lower groove are provided with relief passages while those of the upper groove are not.

These and other features and advantages of the invention will be more fully understood from the following description of a preferred embodiment taken together with the accompanying drawing.

BRIEF DESCRIPTION OF THE DRAWING

In the drawing:

FIG. 1 is a fragmentary cross-sectional view of a ported engine cylinder having therein a piston assembly formed in accordance with the invention and having a portion broken away to show the internal construction of the lower skirt;

FIG. 2 is an enlarged view of the lower skirt portion of the piston of FIG. 1 illustrating the piston ring, groove and drain features thereof;

FIG. 3 is a fragmentary side elevational view of the piston of FIGS. 1 and 2 showing the form of one of the skirt relief scallops; and FIG. 4 is a fragmentary bottom view of a portion of the piston of FIGS. 1 through 3 further illustrating the form of one of the skirt relief scallops.

BEST MODE FOR CARRYING OUT THE INVENTION

Referring now to the drawing in detail, numeral 10 generally indicates an internal combustion engine of the two-cycle diesel type. Engine 10 includes a number of cylinders 11 defined by cylinder liners 12 only one of which is shown. Liner 12 includes intermediate its ends a plurality of inlet air ports 14 extending around the periphery of the liner to permit the passage of charging and scavenging air from the engine air chamber not shown into the engine cylinder. The arrangement of the cylinder liner in the engine may, for example, be substantially as shown in the disclosure of U.S. Pat. No. 3,400,695 Zaruba assigned to the assignee of the present invention.

Within the cylinder 11 defined by liner 12, there is reciprocably disposed a piston 16 which may be constructed generally in the manner of the piston disclosed in U.S. Pat. No. 3,555,972 Hulsing assigned to the assignee of the present invention. However, it differs therefrom in ways to be subsequently described.

Piston 16 includes a closed end 18 which cooperates with the upper closed end of the cylinder, not shown, to define a variable volume working and combustion chamber which is open to the inlet ports at the bottom of the piston travel as illustrated in FIG. 1. The piston closed end is connected by an outer wall 20 with an open lower end 22 of the piston opposite the closed end. The interior 24 of the piston 16 is hollow, except for suitable supporting structure, and is thereby adapted to receive cooling oil supplied in any convenient manner, such as through an associated connecting rod 26, in order to cool the piston walls. While the outer wall 20 of the piston may be formed as a single integral element, the illustrated construction as more fully described in the previously mentioned U.S. Pat. No. 3,555,972 is made up of two separate sections, the lower skirt portion of which is adapted to engage the cylinder wall during reciprocation of the piston.

The upper portion of the outer wall near the closed end of the piston is provided with a plurality of peripheral grooves in which are retained compression rings 28. These are conventionally arranged to engage the wall of the cylinder for sealing the piston against the leakage of compression and combustion gases when the piston moves upwardly above the inlet ports 14.

Near its lower open end, as shown in FIGS. 2 and 3 as well as FIG. 1, the outer wall of the piston is provided with a pair of axially spaced oil control ring grooves 30 and 32 that extend peripherally around the piston slightly above the bottom edge. Within the upper ring groove 30, there are received dual unvented oil rings 34, 36. Each of the oil rings has a scraper edge which is forced into engagement with the opposing wall of the cylinder 11 by a common spring expander 38 located in the bottom of the ring groove. In the lower ring groove 32, there are provided a pair of vented oil rings 40, 42, each having a scraper edge which is forced into engagement with the opposed cylinder wall by a spring expander 44 disposed in the bottom of the ring groove. The vented rings 40, 42 are provided with vent passages 46 on their lower sides to permit oil scraped from the cylinder wall by the upper ring 40 to be vented around the lower ring to the lower piston land for return to the engine crankcase.

It will be noted that the lower portion of the piston skirt adjacent the oil ring grooves is completely free of drain passages extending to the interior of the outer wall. This differs from the construction of the piston shown in U.S. Pat. No. 3,555,972 wherein such drain passages 73 are shown in the lower portion of the piston skirt below the respective ring grooves 72. Since such drain passages are eliminated in accordance with the present invention, the lower edge 48 of the piston skirt outer wall may act as the initial oil control scraper, limiting the amount of oil remaining on the cylinder during downward movement of the piston to an amount permitted by the relatively close clearance of the lower portion of the piston skirt within the cylinder. Since no drain passages are provided through the piston wall above this lower edge, there is no possibility of lubricating or piston cooling oil bypassing the scraping action of this lower edge and being deposited upon the cylinder wall from the interior of the piston as was possible with many of the previously known constructions.

Secondary control of oil on the cylinder wall is provided by the dual lower oil rings 40, 42 which engage the wall of the cylinder and scrape off excess oil for return to the crankcase below. In order to prevent the buildup of excess oil below the second ring groove, the portion of the outer wall below the second ring groove 32 is provided with a pair of oppositely placed scallops or recesses 50. These act as relief recess means extending from the lower open edge of the piston up to the bottom of the lower ring groove 32. These recesses or scallops are preferably placed on the piston skirt at points lying in a vertical plane through the axis of the piston pin not shown. These points lie at extreme positions away from the thrust and anti-thrust sides of the piston. Thus, they are in locations away from the maximum side motion of the piston within the cylinder, permitting the recesses to perform their oil drain functions with a minimum of interference from relative piston motion.

In operation of an engine in accordance with the described embodiment, the piston is reciprocated within the cylinder from a bottom dead-center position as illustrated in FIG. 1 upwardly to a position wherein the oil control rings are located somewhat below the cylinder inlet ports 14 and then again returned to the bottom dead-center position in a continuing cycle, cooling oil being supplied to the interior of the piston as previously mentioned. During this operation, the oil control rings in the ring grooves 30 and 32 provide a downward scraping action to prevent the excessive upward movement of oil along the cylinder walls to the air inlet ports or combustion chamber. The draining of oil scraped from the walls by the oil rings is facilitated by the dual scallops or recesses 50 provided on the outer surface of the lower wall below the bottom ring groove 32.

The absence of drain openings through the outer wall from the piston interior prevents bypassing of the oil rings by lubricating or piston cooling oil from the piston interior as was possible in previous arrangements. Also, the provision of the dual non-vented oil rings 34, 36 in the upper groove 30 aids oil control and further provides a better seal against the escape of inlet air from the ports 14 to the crankcase. This sealing effect is further aided by the absence of drain openings below the upper oil ring groove and behind the lower groove. Thus the arrangement of the present invention provides improved oil control, particularly as applied to oil lubricated pistons, and further provides more effective sealing of the charging and scavenging air from the inlet ports against leakage into the crankcase when applied to a ported cylinder engine.

While the invention has been described by reference to a specific preferred embodiment, it should be understood that numerous changes could be made in the details of construction illustrated without departing from the spirit and scope of the inventive concepts described. Accordingly, it is intended that the invention not be limited to the specifically illustrated features, but that it have the full scope permitted by the language of the following claims.

The embodiments of the invention in which an exclusive property or privilege is claimed are defined as follows:

1. A piston assembly providing improved oil control and air sealing for a ported cylinder internal combustion engine, said piston assembly comprising a piston adapted to be received within a ported engine cylinder and having closed and open ends, an outer wall having an outwardly facing surface for engagement with such cylinder, and a hollow interior adapted to be supplied with cooling oil, compression rings carried in grooves in the outer wall near the piston closed end for sealing engagement with such engine cylinder, and the improvement comprising a pair of axially spaced peripheral oil ring grooves in the outer wall near the piston open end, said wall being free from drain openings through the wall to the hollow interior in the vicinity of said ring grooves, oil control rings received at least one in each of said ring grooves for engagement with such engine cylinder to scrape oil toward the piston open end, said at least one oil ring received in the ring groove furthest from the piston open end being non-vented to provide a seal against air leakage from the cylinder ports toward the piston open end, and said at least one oil ring received in the ring groove nearest the piston open end being vented to aid drainage of oil toward the piston open end, and relief recess means in said outer wall surface and extending from the piston open end to the closest oil ring groove to provide free drainage from the lower ring groove for oil scraped from the cylinder by the oil control rings.

2. The assembly of claim 1 wherein the relief recess means comprise a pair of scallop recesses disposed near the vertical plane passing through the axis of oscillation of the piston with respect to an associated connecting rod, the remainder of the said outer wall surface near the piston open end being unrecessed to provide effective initial oil scraping action by the lower edge of the piston open end.

3. In combination in an internal combustion engine, a cylinder having intake ports intermediate the ends thereof to admit intake charges to the interior of the cylinder, a piston reciprocably received within the cylinder and having closed and open ends, an outer wall having an outwardly facing surface engageable with the cylinder, and a hollow interior adapted to be supplied with cooling oil, compression rings carried in grooves in the outer wall near the piston closed end and in sealing engagement with the engine cylinder, said compression rings and the piston closed end traversing the cylinder intake ports during reciprocation of the piston to periodically admit intake air charges to the cylinder, a pair of axially spaced peripheral oil ring grooves in the outer wall near the piston open end, said outer wall being free from drain openings through the wall to the hollow interior in the vicinity of said ring grooves, oil control rings received at least one in each of said ring grooves and in engagement with the engine cylinder to scrape oil toward the piston open end, said oil ring grooves and oil rings remaining below said intake ports during piston reciprocation to limit communication of the intake ports with the lower portion of the cylinder, said at least one oil ring received in the ring groove furthest from the piston open end being non-vented to provide a seal against air leakage toward the piston open end, and said at least one oil ring received in the ring groove nearest the piston open end being vented to aid drainage of oil toward the piston open end, and relief recess means in said outer wall surface and extending from the piston open end to the closest oil ring groove to provide free drainage from the lower ring groove for oil scraped from the cylinder by the oil control rings.

4. The combination of claim 3 wherein the relief recess means comprise a pair of scallop recesses disposed near the vertical plane passing through the axis of oscillation of the piston with respect to an associated connecting rod, the remainder of the said outer wall surface near the piston open end being unrecessed to provide effective initial oil scraping action by the lower end of the piston open end.

* * * * *